June 13, 1950          C. R. STEVENS          2,511,381
METHOD FOR PRODUCING STAPLE FIBERS
Filed Oct. 26, 1946
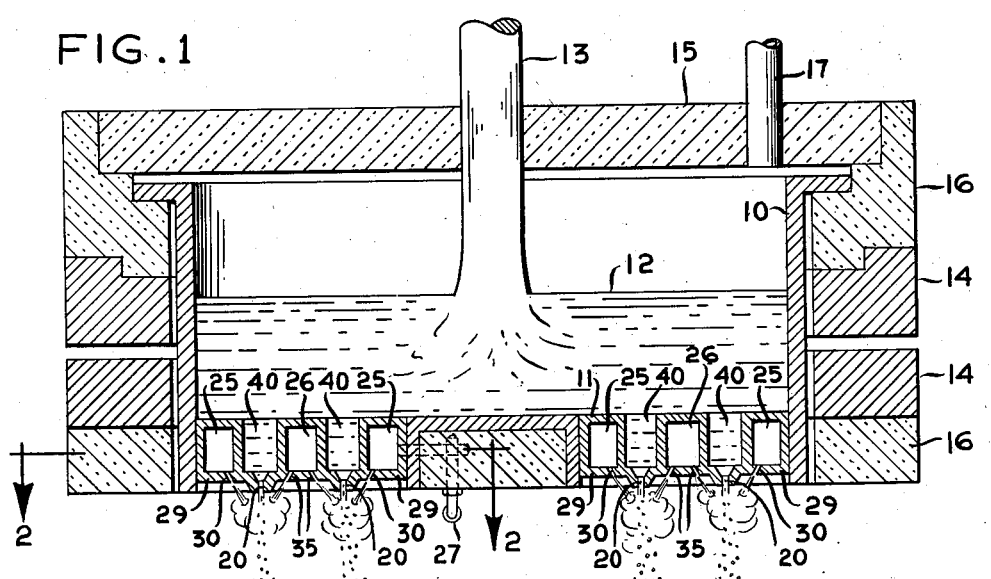
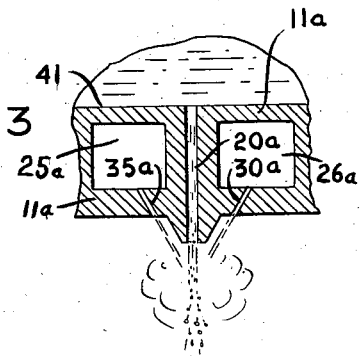
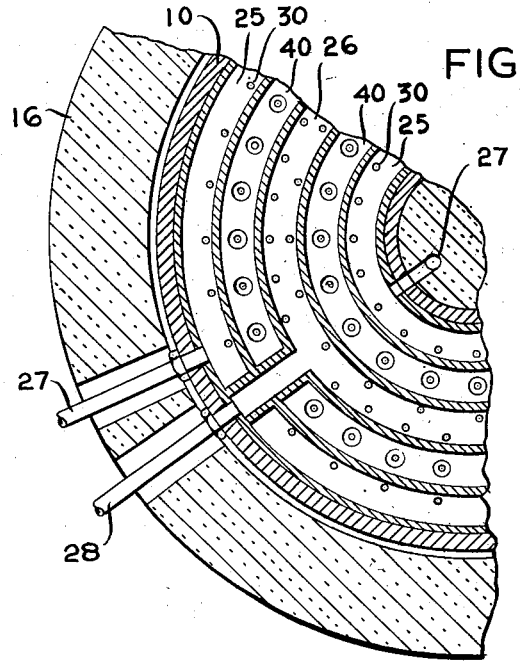
INVENTOR
CHARLES R. STEVENS
BY
Toulmin & Toulmin
ATTORNEYS Patented June 13, 1950

2,511,381

UNITED STATES PATENT OFFICE 2,511,381

METHOD FOR PRODUCING STAPLE FIBERS

Charles R. Stevens, Toledo, Ohio, assignor, by mesne assignments, to Glass Fibers, Inc., Waterville, Ohio Application October 26, 1946, Serial No. 705,901

2 Claims. (Cl. 18—47.3)

1

This invention relates to a method for producing staple or filter fibers of glass.

One of the difficulties in producing glass staple or filter fibers is that of breaking up the molten glass into short fiber lengths when the glass is being discharged from a heating crucible. It is preferable to break up the molten glass at the instant it is discharged from a melting crucible so that the short glass fibers produced in the operation of breaking up or dispersing the glass will be intermingled at random to form a bat or pad, the intermingling of the fibers causing the pad or bat to adhere together sufficiently to allow handling of the bat or pad in subsequent manufacturing operations.

An object of the invention is to provide a method for producing staple or filter fiber by melting a quantity of glass or other material which will be discharged from the melting crucible into the path of a stream of high pressure combustible gas for breaking up the molten material or glass into fine fibers or filaments of short length as it discharges from the melting crucible.

Another object of the invention, in accomplishing the foregoing object, is to raise the temperature of the combustible gas to above its ignition point and retain it out of contact with air or oxygen so that it can be delivered under high pressure against streams of molten material such as glass issuing from a melting crucible and obtain simultaneously the benefits of expansion and ignition of the gas at the discharge point adjacent the stream of molten material to obtain a quantity of gas under high pressure which ignites with instantaneous explosive combustion at its discharge point adjacent the stream of molten glass to break up the stream of molten material into fine fibers or filaments of short length, the stream of molten material being the target of the explosive effect of the stream of high pressure combustible gas.

Still another object of the invention is to provide a method to obtain the foregoing objects wherein the combustible gas is conducted through chambers that are thermally heated by the body of molten material such as glass and thereby raise the temperature of the gas to above its ignition point so that the gas will expand to obtain a high pressure force of the gas and which will promptly ignite with explosive force upon release of the gas through small orifices adjacent the stream of molten material issuing from the melting crucible.

Further objects and advantages will become apparent from the drawings and the following description.

Figure 1 is a vertical cross-sectional view through a melting chamber incorporating features of this invention.

Figure 2 is a horizontal cross-sectional view of a portion of the device illustrated in Figure 1 and is taken along line 2—2 of Figure 1.

Figure 3 is an enlarged vertical cross-sectional view through a modified form of discharge plate.

When producing staple or filter fibers from glass, or other molten materials, it is essential that the streams of molten material issuing from the melting chamber shall be broken up before the material solidifies so as to form the fine fibers or filaments of short length that constitute the staple or filter fibers.

In this invention the explosive force of a gas developed upon ignition of the gas is utilized to obtain the pressure required to break up streams of molten material into fine fibers or filaments of short length. It is well known that gases, upon ignition, develop many times their initial volume, and in doing so, tremendous pressure, or force is produced instantaneously with the ignition of the gas. This force is that which will be utilized in this invention to obtain large volumes of gas at high pressure to break up a stream of molten material, such as glass, into fine fibers or filaments of short length.

The apparatus for accomplishing the purpose of this invention is illustrated in a preferred form and consists of a melting crucible 10 having a chambered bottom wall 11. The crucible 10 contains a body of molten glass 12 which is continuously supplied by means of a glass rod 13 being fed into the crucible 10 under suitable control. The crucible 10 is provided with high frequency induction coils 14 positioned around the same that are connected to a suitable source of high frequency energy for inducing a heating of the crucible 10. The heating of a metal crucible 10 by high frequency energy is now well known in the art, and since any suitable source of high frequency energy can be connected to the coils 14 to provide the desired heat energy for melting and maintaining the glass body 12 in a molten condition, this part of the apparatus is not disclosed or described.

Preferably, the body of glass 12 in the heating crucible 10 is melted at a temperature of about 2800° F. The heating coils 14 are positioned sufficiently high above the bottom wall of the crucible that the glass discharging through the openings in the bottom wall is at a somewhat lower temperature of about 2250° F. which has been found to be a most satisfactory drawing temperature for the glass. However, the viscosity of the glass at the lower temperature is such that the glass will not flow freely through the openings in the bottom wall of the crucible. Thus, a low pressure is applied upon the body of the glass in the crucible which can be introduced through the pipe 17.

The heating crucible 10 is suitably insulated against substantial loss of heat by means of the heat insulating top wall 15 and the side walls 16.

The chambered bottom wall 11 of the heating crucible 10 is provided with a plurality of openings 20 through which streams of molten glass are exuded. These openings 20 are relatively small in size, and are of just sufficient size that the molten glass exuding through the opening will be completely broken up into fine fibers or filaments of short length by means of the high pressure gas streams utilized in this invention.

The heating coils 14 may be adjustable vertically relative to the crucible 10 to vary the heating effect upon the glass in the crucible to obtain the desired high melting temperature in the upper portion of the crucible and the desired low drawing temperature in the glass as it exudes through the openings 20 for drawing thereof.

A conveyor belt 21 running over rollers 22 may conduct the staple fiber from beneath the melting crucible 10 as it is formed.

The chambered bottom wall 11 of the melting crucible 10 is provided with annularly formed combustible gas chambers 25. Also, a chamber 26 is provided in the bottom wall 11 adapted to receive air or oxygen to aid in complete combustion of the gas discharged from chambers 25.

The gas chambers 25 are provided with inlet conduits 27 to supply gas under pressure into the chambers 25 and the air chamber 26 is provided with the inlet conduit 28.

The bottom wall 29 of the gas chambers 25 is provided with a plurality of angularly positioned openings 30 which are arranged so that the axis of the respective openings 30 intersect the axis of the adjacent openings 20 at a point closely below the openings 20. Thus, gas streams that emit from the openings 30 strike and intersect the streams of glass exuding through the openings 20.

It will be noted that the gas chambers 25 are in thermal contact with the body of molten glass in the heating crucible 10, and to some extent are within the field of the high frequency heating coils 14. Thus, the temperature of the combustible gas passing through the gas chambers 25, approaches the temperature of the body of molten glass, and is substantially above its ignition point while within the chambers 25 and at the time of emission from the openings 30.

However, since the combustible gas is in a relatively pure condition within the chambers 25, no combustion takes place within the chambers 25.

However, when the high temperature combustible gas discharges through the orifices or openings 30 in contact and mixture with air, the combustible gas will immediately burst into flame with practically an explosive effect because of its high pressure and high temperature at the instant of discharge from the openings 30. This ignition of the combustible gas produces a volume of gas many fold greater than the initial volume of gas discharging from the openings 30, and the practically explosive ignition of the gas produces an intensely high pressure force area adjacent the stream of molten glass issuing through the openings 20 which practically explodes the glass into small fibers or filaments. Since the explosive effect of the combustible gas is directed downwardly away from the chambered bottom wall 11 of the melting crucible 10, the fine fibers or filaments produced as a result of the explosive effect of the gas will be carried downwardly onto the conveyor belt for delivery away from beneath the melting chamber 10.

Since the explosive effect of the combustible gas, and ignition thereof immediately upon issuing from the openings 30 is such that all immediately available air will be quickly used up within the immediate vicinity of the ignition point of the gas, it is preferable to supply additional quantities of air into the stream of combustible gas to insure complete ignition of it. This is accomplished by causing the air or oxygen delivered into the chamber 26 to issue through openings 35 that are disposed angularly toward the openings 20 and intersect the axis of the openings 20 at substantially the same point that the streams of gas issuing through openings 30 intersect the openings 20. The air supply to the high temperature combustible gas will also be heated to substantially the same temperature of the combustible gas since the chamber 26 is in thermal contact with the glass in the crucible 10. With the air delivered into the gas streams at a high temperature, there will be no substantial drop in temperature of the combustible gas which would tend to cause the temperature of the gas to fall below its ignition temperature and thus reduce the effect of the complete combustion of the combustible gas issuing through the openings 30.

The streams of air issuing through the openings 35 will, of course, have some effect upon breaking up the body of molten glass issuing from the openings 20 but its effect will be substantially less than the effect of the substantially instantaneous explosive ignition of the combustible gas issuing through the openings 30.

In Figure 1 the openings 20 are illustrated as being positioned in the bottom of an annular well 40. However, the bottom wall of the melting crucible 10 may be substantially flat in the manner illustrated in Figure 3, the openings 20a extending to the surface 41 of the bottom wall 11a of the melting crucible. In this instance the length of the passages 20a provides for a somewhat better control over the temperature drop of the glass from that in the body of the glass at melting temperatures in the crucible to that at drawing temperature as it discharges from the openings 20a, the openings 20a, in effect, providing means to separate the glass at melting temperature from the glass at drawing temperature. Also, the gas passing through the chambers 25 and 26a has a cooling effect on the glass passing through the openings 20a to aid in lowering the temperature of the glass to the desired drawing temperature.

While in Figure 1 of the drawings, and in the description concerning it, mention has been made that the gas streams issue from one side only of the openings 20, yet it will be understood that a plurality of gas streams 30 can be directed toward the axis of the openings 20 and intersect the same to increase the force developed, should such an arrangement be desirable or necessary. Also, a plurality of air streams can be introduced into the gas streams for producing complete combustion of the gas and be disposed to intersect the axis of the opening 20 and beneath the same.

It is understood that the method disclosed herein illustrates one form of the invention, but that modifications can be made without departing from the spirit of the invention and that all modifications that fall within the scope of the appended claims are intended to be included herein.

Having thus fully described my invention what I claim as new and desire to secure by Letters Patent is:

1. The method of producing fibers or filaments from molten material that includes, causing molten material to exude through small openings, and releasing a combustible gas at above ignition temperature into the atmosphere at the openings with instantaneous ignition of the combustible gas at the openings with the molten material exuding through the openings as the target of the explosive effect of the instantaneous ignition of the combustible gas to disperse the molten material thereby into fibers of short length.

2. A method of producing fibers or filaments of short length from molten material that includes, causing molten material to exude through small openings, heating a combustible gas to above its ignition temperature while retaining the same in confined condition to prevent ignition of the gas, and releasing the combustible gas at above its ignition temperature into the atmosphere in streams directed angularly toward the axis of the openings through which the molten material exudes and in the direction of flow of the molten material to cause substantially instantaneous explosive combustion of the gas as it is released with the stream of molten material as the target for the explosive effect of the ignition of a gas for dispersal of the molten material thereby into fibers of short length.

CHARLES R. STEVENS.

REFERENCES CITED

The following references are of record in the file of this patent:

UNITED STATES PATENTS

| Number | Name | Date |
| --- | --- | --- |
| 1,627,982 | Maguet | May 10, 1927 |
| 2,006,891 | Hegmann | July 2, 1935 |
| 2,175,225 | Slayter | Oct. 10, 1939 |
| 2,207,764 | Soubier | July 16, 1940 |
| 2,233,304 | Bleakley | Feb. 25, 1941 |
| 2,338,473 | Von Pazsiczky | Jan. 4, 1944 |

FOREIGN PATENTS

| Number | Country | Date |
| --- | --- | --- |
| 514,243 | Great Britain | Nov. 2, 1939 |